March 3, 1959    D. M. NICHOLSON    2,875,477
SHELTER FOR ANIMALS
Filed Aug. 5, 1955

INVENTOR.
Donald M. Nicholson
BY
*McGrew & Edwards*
ATTORNEYS

United States Patent Office 2,875,477
Patented Mar. 3, 1959

2,875,477

SHELTER FOR ANIMALS

Donald M. Nicholson, Denver, Colo., assignor to Nicholson Manufacturing, Inc., Denver, Colo., a corporation of Colorado Application August 5, 1955, Serial No. 526,723

6 Claims. (Cl. 20—.5)

This invention relates to moisture and abrasion resisting housings and particularly to such housings which are employed as shelters for animals.

When animals, such as dogs and cats, are kept in relatively small shelters, for example, the cages or compartments commonly used in veterinary hospitals, it is necessary that the individual shelters be kept clean and sanitary. The cleaning and disinfecting of the individual shelters requires substantial time and labor and various forms of shelters have been provided for the purpose of securing ease of cleaning and maintenance; these animal shelters have been made of metal and of various forms of water impervious substances and synthetic materials such as plastic impregnated fibrous materials. It is also desirable that the surface of the shelter be hard and resistant to abrasion such as that caused by scraping of the animal's claws. The various structures heretofore provided have met with varying degrees of success and the costs of some have been too high for average requirements. Accordingly it is an object of this invention to provide an improved animal shelter which may be cleaned easily and which resists moisture and abrasion.

It is another object of this invention to provide an improved method for constructing animal shelters and the like.

Further objects and advantages will become apparent as the following description proceeds and the features of novelty which characterize the invention will be pointed out with particularity in the claims annexed to and forming a part of this specification.

Briefly, in carrying out the objects of this invention, an animal shelter or cage is provided which comprises a rectangular box, open on one side and constructed of wood or similar material. The interior of the box and the flange adjacent the open side are coated with a hard plastic material, preferably a polyester resin which provides an integral, homogeneous lining free from air bubbles or similar imperfections and which is impervious to water and sufficiently hard to resist wear or abrasion due to the scratching of the animal's claws against the surface of the shelter. In constructing the shelter, a box is first formed of sheet material, such as plywood, with a flange or frame about the open side. Separate sheets are employed for each side and the sheets are secured together in any suitable manner, such as by glueing, or nailing, or both. The box is then placed on a level surface and the side adjacent the surface is leveled so that a liquid poured on the wall thereof may easily be distributed over the entire surface. A temporary liquid dam is formed across the front of the shelter to a height sufficient to retain the amount of liquid to be employed. The liquid employed is a liquid polyester resin and is mixed with a suitable amount of catalyst so that it will harden within say forty-five minutes, and a quantity sufficient to cover the side of the cage to the required depth is then poured onto the level side until it is distributed evenly over the entire side. This operation is then repeated for the other sides and finally for the back wall opposite the open side and for the flanges, suitable dams being provided each time it is necessary to prevent the liquid from flowing over the edge of the leveled portion of the shelter. During this process the plastic material is bonded securely to the wooden surfaces and when hardened not only provides a moisture resistant and abrasion resistant surface, but also acts as a bonding member holding the entire cage rigidly assembled to provide a strong and rigid construction. A suitable gate or closure may be secured to the flange provided around the open end of the shelter.

For a better understanding of the invention, reference may be had to the accompanying drawing in which.

Figure 1:
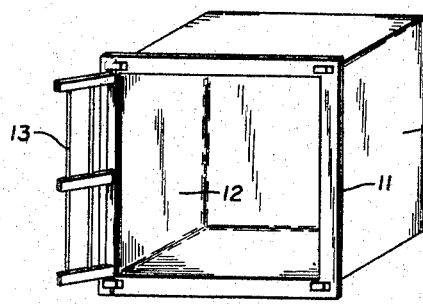
Fig. 1 illustrates an animal shelter embodying the invention.

Referring now to the drawing, the animal shelter or cage illustrated in Fig. 1 comprises a boxlike wooden structure 10 having its forward side open and provided with a flange 11 forming a frame extending entirely around the open side. The interior of the box 10 and the outwardly facing side of the flange 11 are covered with a continuous layer 12 of polyester resin which provides a complete integral liner and outwardly facing flange of moisture resistant and abrasion resistant material. A suitable gate or door 13 is secured to the flange 11 and is preferably a door assembly of the type described and claimed in a copending application of the same inventor, Serial No. 493,428, filed March 10, 1955, and assigned to the same assignee. The interior corners formed by the plastic material are rounded and the entire surface is smooth and free from recesses or crevices and may therefore be cleaned easily.

Figure 2:
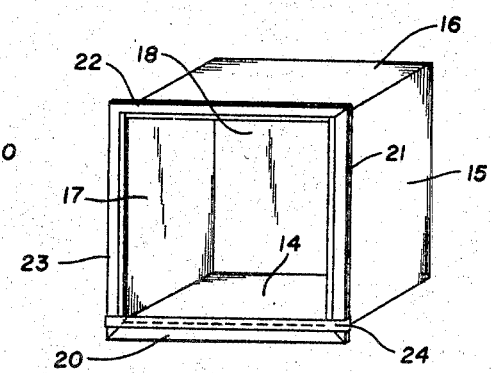
Fig. 2 illustrates the wooden shell forming the body of the shelter.

The novel method employed for constructing the animal shelter shown in Fig. 1 will be described in connection with the various stages illustrated in Figs. 2 through 8 inclusive. The initial step in the process is the construction of a base or form from a suitable material such as plywood which has a surface that is wetted by liquid polyester resin and assures a secure bond with the resin when it hardens. As shown in Fig. 2 the form is of boxlike construction, the shelter shown having four walls and a back wall indicated by the numerals 14, 15, 16, 17 and 18, respectively. A frame is formed about the open end by flat strips 20, 21, 22 and 23, secured respectively to the walls 14, 15, 16 and 17. These strips are secured edgewise about the opening of the wall and are beveled at 45 degrees at their corners to provide a rectangular frame. The boxlike form, as illustrated in Fig. 2, is secured together by nailing the several sheets 14, 15, 16, 17 and 18 along their adjacent edges and further may be held by glue or cement between these adjacent edges. The frame members 20, 21, 22 and 23 are similarly secured about the opening of the box and flush with the open edges so that a flat face is provided. The box is then supported on a suitable bench or other structure and the wall 14 is leveled; a dam 24 which may be a piece of masking tape, is then secured across the lower edge of the front wall and is held in place to provide a liquid seal adjacent the forward edge of the wall 14. A quantity of liquid polyester resin is then prepared and colored to provide the desired color for the completed liner for the shelter. A suitable catalyst is then mixed with the resin, it being selected so that the resin will remain liquid for a sufficient time to afford uniform covering of the wall area, but will harden in say forty-five minutes. The actual hardening time has been found to vary with ambient conditions and the interior may harden in a period varying from say one-half hour to one and one-half hours under different ambient conditions. A quantity of the mixed resin and catalyst is then poured over the wall 14 to the required depth, say one eighth of an inch, and a stirrer or blade is employed to spread the liquid and make sure that the entire surface is wet by the resin so that the final coating will spread evenly over the entire inner surface of the wall before hardening. A layer of plastic will then be formed as shown in the enlarged view, Fig. 3, where the layer of polyester resin is indicated at 25, it being noted that a meniscus is formed around the edge of the layer as indicated at 26, it being understood that this meniscus extends entirely around the four sides of the layer.

Figure 4:
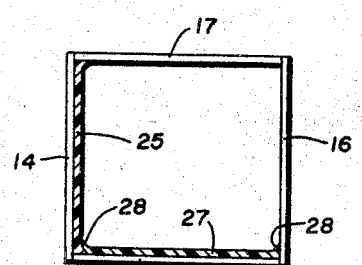
Fig. 4 is a front sectional view of the shell of Fig. 2 during the coating of the second wall thereof.
Figure 3:
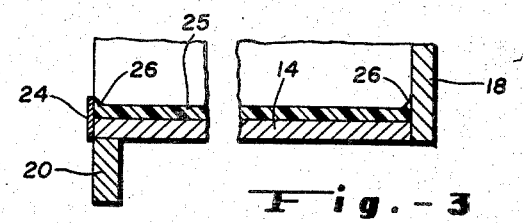
Fig. 3 is an enlarged longitudinal sectional view of the lower portion of the shell of Fig. 2, showing the bottom wall after the coating of plastic is in position.
Figure 5:
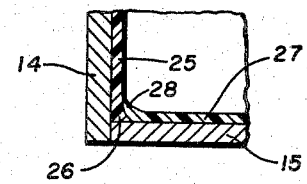
Fig. 5 is an enlarged view of one corner of the shelter at the stage shown in Fig. 4, showing the joining of the two layers of plastic material.

After the layer 25 has hardened sufficiently, the form is turned and one of the other side walls, say the wall 15, is supported and leveled and provided with a dam in the same manner as wall 14. The form is now positioned as shown in Fig. 4 and a layer 27 is deposited on the wall 15 in the same manner as the layer 25 on the wall 14. Layer 27 has a meniscus extending about the four sides of the wall 15 and along the adjacent side walls and the dam in the same manner as the wall 14 as indicated at 28. The meniscus 28 will extend upwardly against the layer 25 on the wall 14 along the common edge as indicated in Fig. 5. In this manner the adjacent edges of the layers 25 and 27 are bonded together and also provide a rounded and easily cleaned corner. In addition the polyester resin wets the surface of the wood and is securely bonded thereto making a very firm and rigid construction reinforced throughout and providing a corner construction which is sufficiently strong for structural purposes whether or not the plywood sheets 14 and 15 are otherwise secured together.

Figure 6:
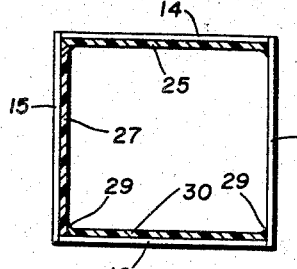
Figs. 6 and 7 are sectional views illustrating the structure during the deposition of the coatings on the next two sides of the shelter.
Figures 7, 8:
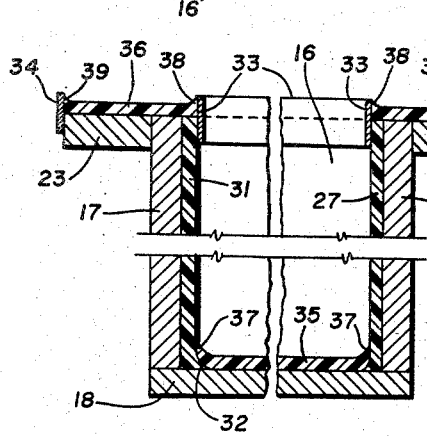
Fig. 8 is an enlarged broken sectional view showing the completed structure after the deposition of the last layers of plastic material.

The remaining side walls 16 and 17 are then provided with layers of polyester resin 30 and 31, respectively, in the same manner as the walls 14 and 15, the walls 16 and 17 being leveled and coated in order as indicated by Figs. 6 and 7. The menisci of the layers 30 and 31 are formed in the same manner as those of the other layers and are indicated at 29 and 32, respectively.

After the completion of the four walls as indicated by Fig. 7, the shelter frame is turned onto its back wall 18 and again leveled. The menisci along the four edges of the opening are then filed or sanded off to make the walls even, and dams of masking tape or other suitable material are secured about the inner and outer edges of the front frame as indicated at 33 and 34 in Fig. 8. The face of the frame about the opening is made parallel with the back wall 18 so that when the wall 18 has been leveled, the face of the frame is also level. A mixture of liquid polyester resin and catalyst is then poured over the wall 18 and distributed evenly and also is poured between the dams 33 and 34 about the front frame. This forms a bottom wall layer 35 and a frame layer 36 extending entirely around the door opening. The layer 35 is formed with a meniscus 37 extending entirely around the inside of the wall 18 and rounding upwardly toward the side walls 14, 15, 16 and 17. The layer 36 extending around the door frame is formed with an inner meniscus 38 and an outer meniscus 39 against the dams 33 and 34. After the plastic layers have hardened, the dams 33 and 34 may be removed and the menisci 38 and 39 ground off to provide a smooth edged outer frame about the door opening.

The shelter formed in the manner just indicated is a rigid, strong structure, which may easily be mounted on a suitable framing as is done for multiple kennels. The interior of the shelter is smooth and hard so that it resists the scratches from animals' claws or other objects, and there is minimum likelihood of the formation of scratches or pockets in which bacteria may lodge; the smooth hard lining makes it easy to clean and disinfect the shelter.

By way of example the invention has been illustrated and described in connection with a four-walled, rectangular, boxlike animal shelter, obviously however it may be employed in the construction of housings or shelters of any desired configuration, wherein the walls are flat and may be leveled to apply the plastic layers.

While the invention has been illustrated and described in a specific form, various modifications and arrangements will occur to those skilled in the art, therefore it is not desired that the invention be limited to the details of construction and methods illustrated and described and it is intended by the appended claims to cover all modifications which fall within the spirit and scope of the invention.

I claim:

1. The method of constructing a moisture and abrasion resistant animal shelter which comprises providing a plurality of flat sheets of structural material, joining the sheets to each other along their adjacent edges to provide the desired form for the shelter, supporting the shelter form with one of the sheets level and with its inner side facing upwardly, providing a dam along any open edges of the level sheet, pouring a quantity of mixed liquid polyester resin and catalyst over the inner surface of the level sheet to the desired depth and allowing the resulting layer to harden, and thereafter covering the remaining sheets with polyester resin in the same manner to provide a complete integral hard plastic liner bonded to the walls of the shelter.

2. The method of constructing a moisture and abrasion resisting animal shelter which comprises providing a plurality of flat sheets of structural material, joining a plurality of the sheets to each other along their adjacent edges to provide the side walls of the desired form for the shelter, securing another one of said sheets to said form to form the back wall thereof, supporting the shelter form with one of said side wall sheets level, providing a liquid dam along the open edge of the level sheet, pouring a quantity of mixed liquid polyester resin and catalyst over the inner surface of the level sheet to the desired depth and allowing the resulting layer to harden, thereafter covering the remaining side wall sheets with polyester resin in the same manner, and thereafter leveling the back wall, covering the interior thereof with polyester resin in the same manner as the side wall sheets whereby a complete integral hard plastic liner is provided bonded to the walls of the shelter.

3. The method of constructing a moisture and abrasion resistant animal shelter which comprises providing a plurality of flat sheets of structural material, joining the sheets to each other along their adjacent edges to provide the desired form for the shelter, securing a laterally extending flange about the edges of said sheets along one side thereof to provide a frame, supporting the shelter form with one of the sheets level and with its inner side facing upwardly, providing a dam along the open edge of the level sheet, pouring a quantity of mixed liquid polyester resin and catalyst over the inner surface of the level sheet to the desired depth and allowing the resulting layer to harden, covering the inner walls of the remaining sheets with polyester resin in the same manner, supporting the shelter form with the frame uppermost and level, providing dams about the edges of the frame, and covering the frame with polyester resin in the same manner as the inner walls of the sheets to provide a complete integral hard plastic liner bonded to the walls of the shelter and extending outwardly about the opening therein.

4. The method of constructing a moisture and abrasion resistant animal shelter which comprises providing a plurality of flat sheets of structural material of the size and shape required for the walls of the shelter, joining the sheets to each other along their adjacent edges to provide the desired form for the side walls of the shelter, securing another of said sheets to the edges of said side walls adjacent one end of the form to provide a back wall for the shelter, securing a laterally extending flange about the edges of said sheets along the sides thereof remote from said back wall to provide a door frame, supporting the shelter form with one of the side wall sheets level and with its inner side facing upwardly, providing a dam along the open edge of the level sheet, pouring a quantity of mixed liquid polyester resin and catalyst over the inner surface of the level sheet to the desired depth and allowing the resulting layer to harden, covering the inner walls of the remaining side wall sheets with polyester resin in the same manner, supporting the shelter form with the back wall and frame level, providing dams about the edges of the frame, and covering the frame and back wall with polyester resin in the same manner as the inner side walls to provide a complete integral hard plastic liner bonded to the walls of the shelter and extending outwardly about the opening therein.

5. The method of constructing a moisture and abrasion resistant animal shelter which comprises providing a plurality of flat sheets of plywood of the shape and size of the walls of the structure to be formed, said plywood having at least one surface subject to wetting by liquid polyester resin on contact therewith, joining the sheets to each other along their adjacent edges with the wettable surface being inwardly to provide the desired form for the shelter, supporting the shelter form with one of the sheets level and with its inner side facing upwardly, providing a dam along any open edges of the level sheet, pouring a quantity of mixed liquid polyester resin and catalyst over the inner surface of the level sheet to the desired depth and allowing the resulting layer to harden, and thereafter covering the remaining sheets with polyester resin in the same manner to provide a complete integral hard plastic liner bonded to the walls of the shelter.

6. The method of constructing a moisture and abrasion resistant animal shelter which comprises providing a plurality of flat sheets of plywood shaped to the desired size of the walls of the shelter and having at least the sides of the sheets which are to face inwardly to the shelter subject to wetting by liquid polyester resin upon contact therewith, joining the sheets to each other along their adjacent edges to provide the desired form for the shelter including the side walls and a back wall, securing a laterally extending flange about the edges of said sheets along the open side of the form and in a plane parallel to the back wall to provide a frame about the opening, supporting the shelter form with one of the sheets level and with its inner side facing upwardly, providing a dam along the open edge of the level sheet, pouring a quantity of mixed liquid polyester resin and catalyst over the inner surface of the level sheet to the desired depth and allowing the resulting layer to harden, covering the inner walls of the remaining side sheets with polyester resin in the same manner, supporting the shelter form with the frame uppermost and the front of the frame and the inner side of the back wall level, providing dams about the edges of the frame, and covering the frame and back wall with polyester resin in the same manner as the inner walls of the sheets to provide a complete integral hard plastic liner bonded to the walls of the shelter and extending outwardly about the opening therein.

References Cited in the file of this patent

UNITED STATES PATENTS

| | | |
|---|---|---|
| 848,528 | Barlow | Mar. 26, 1907 |
| 1,698,517 | Twitty | Jan. 8, 1929 |
| 2,020,256 | Copeman | Nov. 5, 1935 |
| 2,407,479 | D'Alelio | Sept. 10, 1946 |
| 2,443,737 | Kropa | June 22, 1948 |
| 2,703,299 | Seymour et al. | Mar. 1, 1955 |
| 2,754,044 | Bergstein | July 10, 1956 |